(12) United States Patent
Niver

(10) Patent No.: US 8,176,934 B2
(45) Date of Patent: May 15, 2012

(54) VALVE CONTROL ASSEMBLY

(75) Inventor: Michael A. Niver, Plymouth, WI (US)

(73) Assignee: Kohler Co., Kohler, WI (US)

( * ) Notice: Subject to any disclaimer, the term of this patent is extended or adjusted under 35 U.S.C. 154(b) by 1030 days.

(21) Appl. No.: 12/123,802

(22) Filed: May 20, 2008

(65) Prior Publication Data

US 2009/0288714 A1 Nov. 26, 2009

(51) Int. Cl.
*F16K 11/00* (2006.01)

(52) U.S. Cl. .................... 137/359; 137/625.41

(58) Field of Classification Search ............ 137/359, 137/625.4, 625.41, 625.46, 315.17, 637, 137/637.3, 637.2; 4/675–678; 403/223, 403/224, 319; 251/77, 78
See application file for complete search history.

(56) References Cited

U.S. PATENT DOCUMENTS

| | | | |
|---|---|---|---|
| 2,983,279 A | 5/1961 | Biermann | |
| 3,645,297 A * | 2/1972 | Boultinghouse | 137/637.3 |
| 3,770,017 A * | 11/1973 | Enterante | 137/625.17 |
| 4,220,175 A | 9/1980 | Keller et al. | |
| 4,662,389 A | 5/1987 | Igbal | |
| 4,896,381 A | 1/1990 | Hutto | |
| 4,981,156 A * | 1/1991 | Nicklas et al. | 137/270 |
| 5,129,576 A | 7/1992 | Pullen et al. | |
| 5,340,018 A | 8/1994 | MacDonald | |
| 5,725,010 A | 3/1998 | Marty et al. | |
| 5,845,674 A * | 12/1998 | Clare | 137/454.2 |
| 6,807,983 B1 | 10/2004 | Erickson | |
| 7,077,150 B2 | 7/2006 | McNerney | |
| RE39,257 E * | 9/2006 | Kamimura et al. | 123/300 |
| 7,509,971 B2 * | 3/2009 | Kajuch | 137/359 |
| 7,841,362 B2 * | 11/2010 | Kim | 137/637 |
| 2006/0174946 A1 | 8/2006 | Kajuch | |

* cited by examiner

*Primary Examiner* — Craig Schneider
*Assistant Examiner* — Time Aigbe
(74) *Attorney, Agent, or Firm* — Foley & Lardner LLP

(57) ABSTRACT

Valve control assemblies are disclosed which accommodate out of plumb conditions using a flexible set of rings linked to the temperature control, and a projection/axial slot arrangement linked to the volume control. Different wall thicknesses are accommodated using one or more adaptors/extensions between a temperature bonnet control and a portion of the valve cartridge which controls temperature. There is also a combined shroud/tool for protecting the valve during rough-in and permitting it to be tested.

16 Claims, 12 Drawing Sheets

VALVE CONTROL ASSEMBLY

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

The present invention relates to valve control assemblies. More particularly, it relates to thermostatic shower mixers and the like where volume and temperature are separately controlled, and/or relates to assembly features where the assembly accommodates out of plumb installation and/or issues arising during roughing in.

Valve control assemblies are typically used to manage the volume and temperature of water directed to a plumbing fixture, such as a sink, shower head, tub spout, and the like. The valve control assembly is generally mounted through an enclosure surface or tiled over enclosure wall. For some types of other valves, it may be mounted through a counter top or deck.

During the installation process, one or more waterlines are roughed-in with varying degrees of precision relative to enclosure or other walls that will be later installed. As a result, the waterlines are often slightly out of plumb with respect to mounting surfaces for such valves.

Additionally, the ultimate thickness of the wall may vary from application to application, and/or vary based on later finishing processes. This complicates the installer's ability to present a professional appearance after the rough-in stage.

Moreover, those portions of construction which follow plumbing rough-in may expose the plumbing valve to a variety of contamination from drywall finishing, painting, grout and/or the like. Hence, this may complicate the ability of later contractors to do their work most efficiently.

Further, it is desirable after the plumbing has been roughed-in, but before the assembly of the final handles, to test out the valve. Pre-assembling the valve with the final decorative handle and escutcheon, followed by removal thereof to permit final construction, risks losing or damaging those items.

Hence, needs exist for improvements with respect to the above concerns.

SUMMARY OF THE INVENTION

In one aspect the invention provides a valve control assembly configurable to control volume and temperature of water flowing through a plumbing control valve. There is a valve control cartridge which has an axially extending valve stem linked to the valve cartridge such that rotation of the valve stem on its longitudinal axis can control the volume of water flowing through the plumbing control valve if water is supplied to the plumbing control valve. There is also a handle linked to the valve stem to control its rotation.

Other features include a flexible coupling linked to the valve cartridge such that rotation of the coupling on its longitudinal axis can control the temperature of water flowing through the plumbing control valve if two different temperature supplies of water are supplied to the plumbing control valve, and a bonnet positioned around the valve stem and linked to the flexible coupling such that rotation of the bonnet causes rotation of the flexible coupling.

In a preferred form there is a sleeve positioned between the handle and the valve stem, the sleeve having an axially extending slot, and the valve stem having a radial projection positionable in the slot. The projection is thereby accommodated in the sleeve slot regardless of whether the handle is longitudinally aligned with the valve stem. This provides for accommodation for out of plumb conditions with respect to the volume control.

In another preferred aspect there is a flexible coupling which can facilitate transferring rotational force from the bonnet to a portion of the valve cartridge, even when the bonnet is not longitudinally aligned with the valve cartridge. This is a feature that accommodates out of plumb conditions with respect to the temperature control.

In another preferred aspect there is an adaptor operationally positioned between the valve cartridge and the flexible coupling. There may also be one or more extensions positioned between the flexible coupling and adaptor to accommodate different thicknesses of mounting walls. For example, the flexible coupling may include a flange having a plurality of notches that engage a plurality of mating fingers formed in the adaptor.

In another aspect the invention provides a valve control assembly installed through an essentially vertical support wall (e.g. a shower enclosure wall). The valve control assembly is configured to receive water at a valve cartridge and direct that water in response to a water control member positioned adjacent the essentially vertical support wall. The valve cartridge defines a longitudinal valve axis.

The improvement in this embodiment is a resilient drive clip capable of transferring rotational movement of the water control member to a portion of the valve control cartridge regardless of whether the longitudinal valve axis is normal to the vertical support wall or not normal to the vertical support wall. For example, the resilient drive clip can engage a pin coupled to the valve cartridge, comprise a pair of eyelets that are couplable to a pair of posts extending from the water control, and be essentially U-shaped such that it engages a pin between the pair of eyelets located proximate ends of the resilient drive clip.

In yet another aspect the invention provides a valve control assembly which has a valve housing having an axial control stem projecting there from. There is a combined installation tool and shroud capable of removably covering at least a portion of the valve housing during roughing in of room components, while simultaneously being able to engage the valve stem to rotate the stem so as to permit testing of the valve control assembly prior to completing said roughing in.

In preferred forms of this embodiment there is a first part which is a skirt having an opening at one end, and a second part which is a control handle positionable in the skirt opening so as to removably link to the valve stem as well as be able to rotate within the skirt. The handle can include a nib that engages (snaps behind) a resilient flap formed in the skirt opening.

This tool can also have a driver part configured to rotatably engage a mounting nut when the driver is positioned over the mounting nut.

Hence, it will be appreciated that the present invention, in various embodiments, accommodates out of plumb conditions for both volume control and temperature control, accommodates different wall thicknesses, and accommodates protection and testing of the valve during roughing-in and subsequent construction. These advantages can be achieved at relatively low cost, using reliable assembled parts.

These and still other aspects and advantages of the present invention will be apparent from the detailed description and drawings. What follows are merely preferred example embodiments of the present invention. To assess the full scope of the invention the claims should be considered.

DETAILED DESCRIPTION OF THE PREFERRED EXAMPLE EMBODIMENT

Figure 1:
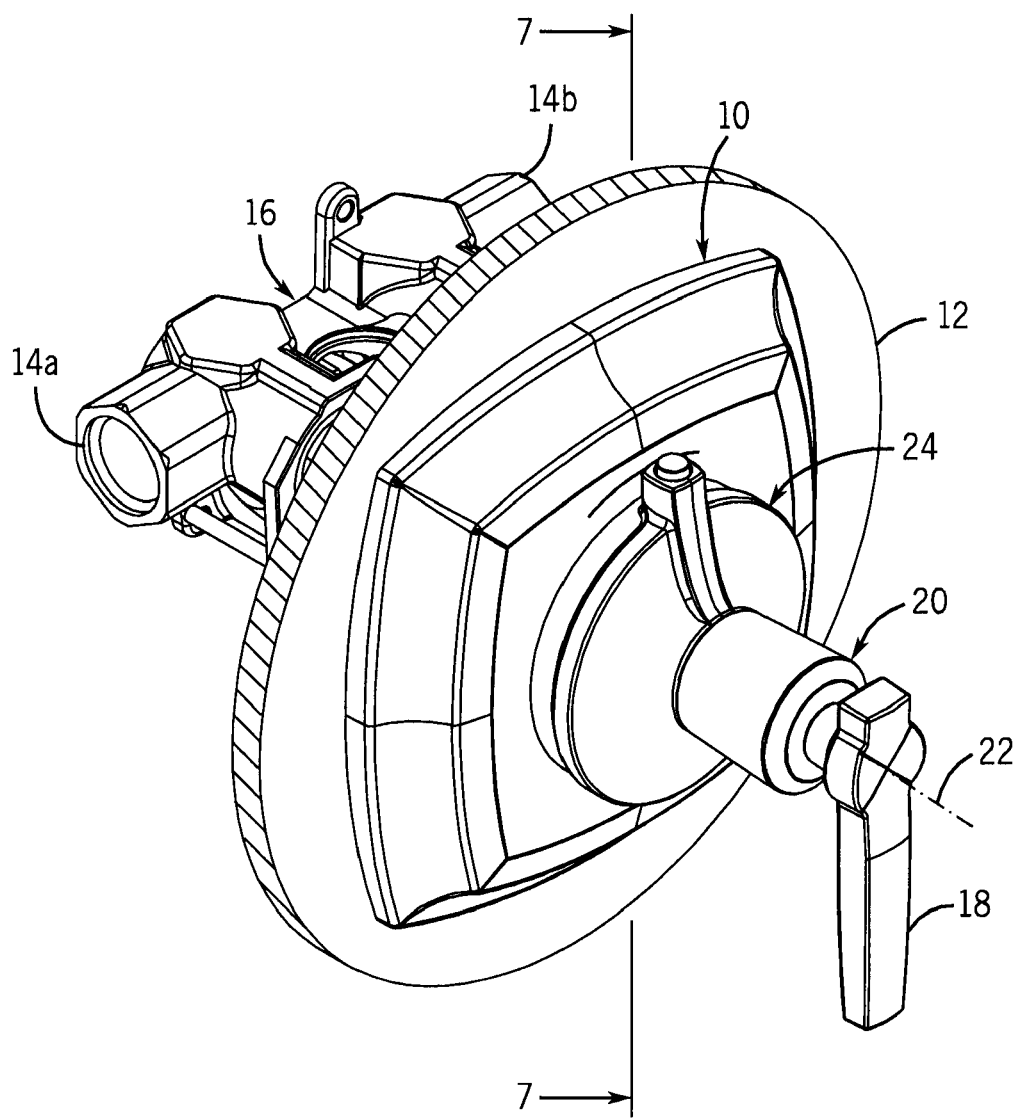
FIG. 1 is a perspective view of a valve control assembly in accordance with the present invention.

There is a valve control assembly 10 capable of controlling both the water flow rate and temperature via coaxial controls. With particular reference first to FIG. 1, valve control assembly 10 is shown adjacent a wall 12 (e.g., an essentially vertical shower enclosure wall). Of course, in other installations the valve could be mounted on an essentially horizontal deck of a tub surround, and the like. The valve control assembly 10 is preferably bolted to framing (not shown) at the rough construction stage.

Water is directed into the valve control assembly 10 through a hot water inlet 14a and a cold water inlet 14b that are both in fluid communication with a valve housing 16. A volume control handle 18 and associated decorative skirt 20 are rotatable to drive a valve stem 98 and thereby meter the flow of water through the valve housing 16.

In the preferred embodiment, the volume control handle 18 is rotatable about a central longitudinal valve axis 22, counterclockwise, from a no-flow position (as shown) to a full-flow position at about one-quarter rotation. The relative mixture of hot and cold water from the hot water inlet 14a and the cold water inlet 14b is separately controlled by rotating a water control member or bonnet 24 about that same valve axis 22. For example, rotating the bonnet 24 clockwise can result in a decreased water temperature. Conversely, rotating the bonnet 24 counterclockwise can result in an increased water temperature.

During the early stages of installation (e.g. rough-in; dry wall; tiling), it is sometimes necessary to protect the valve cartridge 30 and valve housing 16 from contamination by particles and debris associated with the construction process (e.g., drywall remnants and tile mud/grout). To accomplish this task, among others, the valve control assembly 10 may include a removable installation tool/shroud 74, shown in FIGS. 3A, 3B, and 3C. The installation tool/shroud 74 is keyed to pass partially through an opening 76 formed in the wall 12.

Figure 3A:
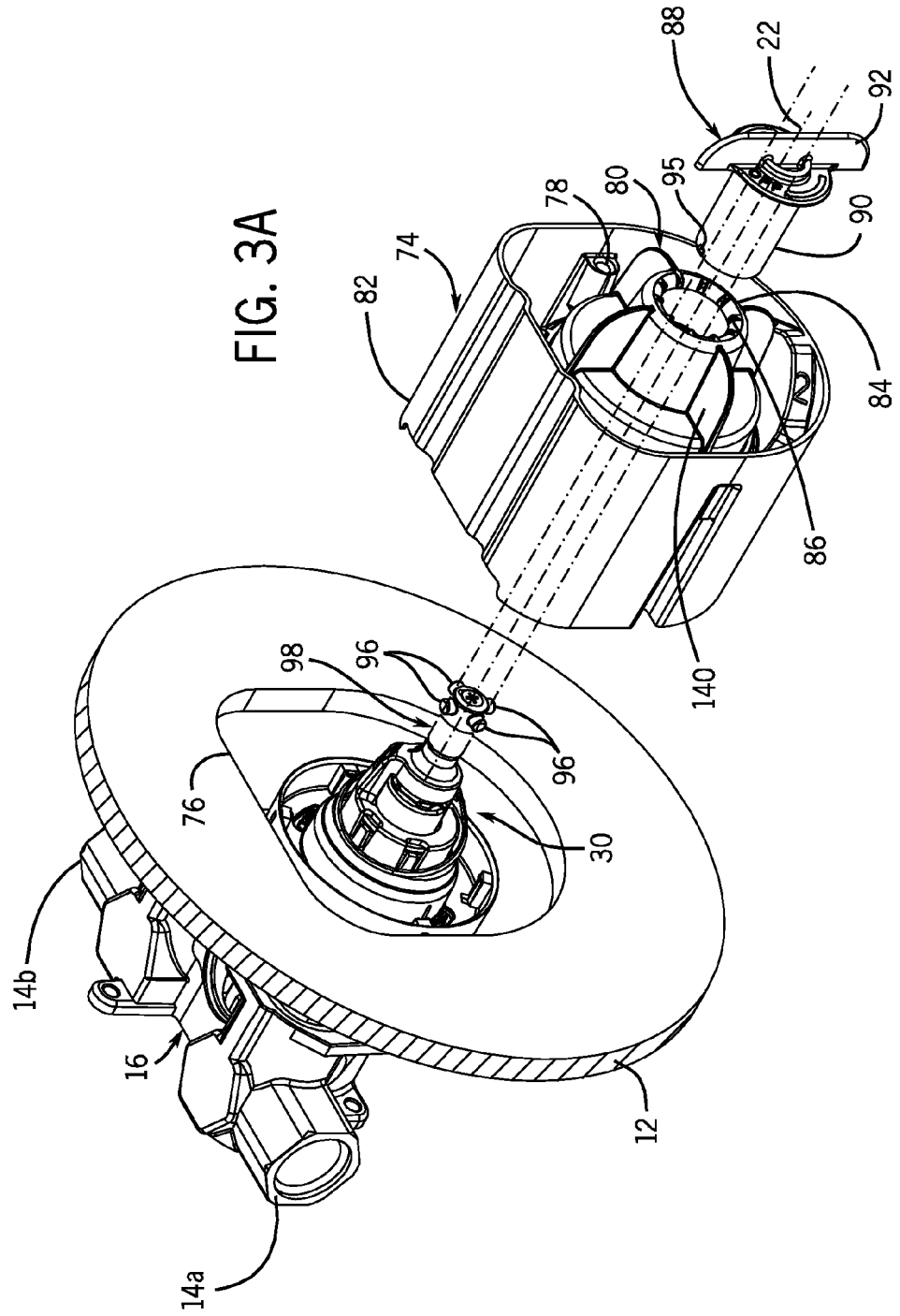
FIG. 3A is a partial exploded view of an installation tool being used with a portion thereof.
Figure 3B:
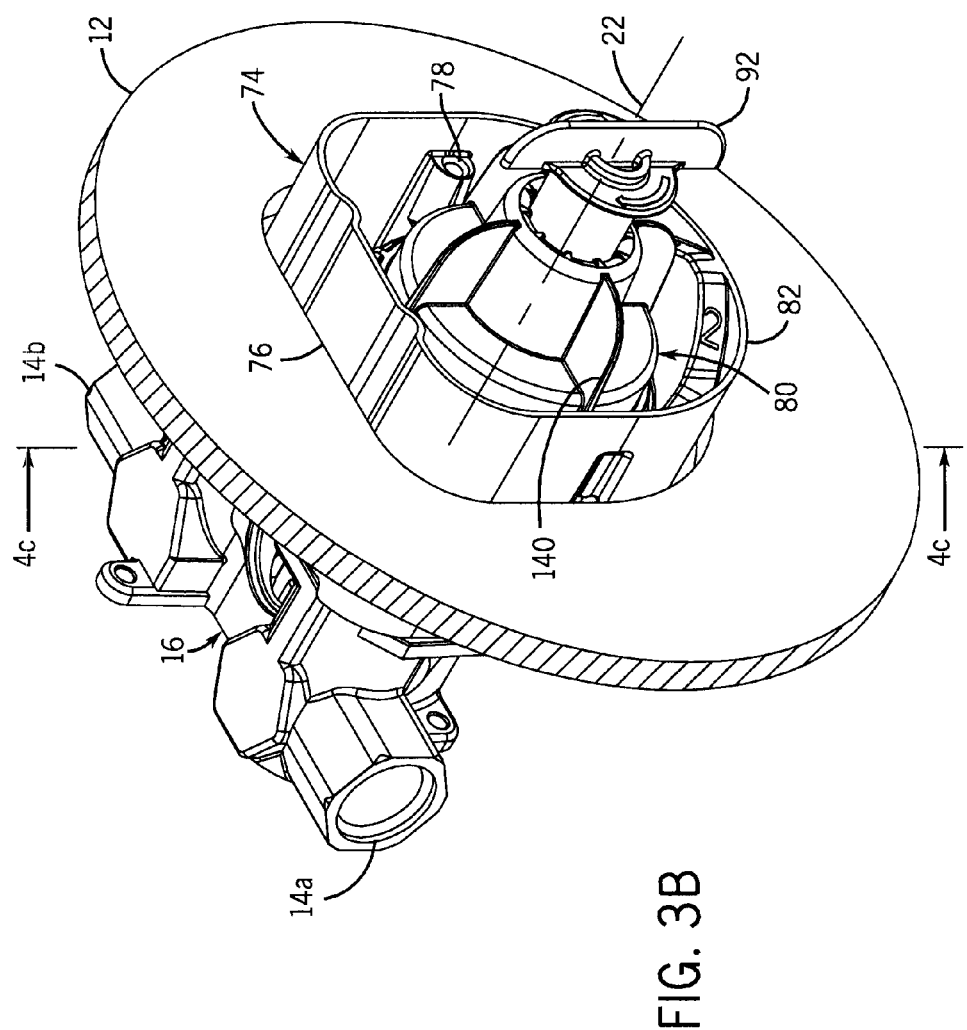
FIG. 3B is a perspective view of a more assembled construction thereof, with the installation tool of FIG. 3A covering a portion of the valve control assembly of FIG. 1.

The installation tool/shroud 74 is releasably secured to the valve housing 16, as shown in FIG. 3B, via fasteners (not shown) that extend partially through holes 78 in the installation tool/shroud 74 and into receiving holes (not shown) in the valve housing 16. The installation tool/shroud 74 can cover at least a roomward portion of the valve control assembly 10 to prevent debris from entering the valve control opening 76 and damaging the installed portion of the valve control assembly 10 during roughing-in.

The installation tool/shroud 74 includes a centrally disposed sleeve or driver 80 that may be integrally formed with the outer shell 82. The driver 80 is skirt-like and includes an opening 84 having a plurality of annularly-spaced, flexible flaps 86. A generally T-shaped volume control handle 88 has a cylindrical portion 90 at one end and a bar portion 92 at the opposite end. The cylindrical portion 90 includes four internal channels 94 so that when the cylindrical portion 90 of the volume control handle 88 is inserted into the opening 84 in the driver 80, four protrusions 96 extending from a flow valve stem 98 of the valve cartridge 30 ride in respective channels 94.

The cylindrical portion 90 also includes a pair of nibs 95 that engage the ends 100 of flaps 86 to releasably, axially snap-fit the volume control handle 88 to the driver 80. Nevertheless, the volume control handle 88 is free to rotate within the opening 84. This allows for rotation of the volume control handle 88, to cause rotation of the valve stem 98, and thus adjust the flow of water though the valve cartridge 30. As a result, the water flow can be tested during the rough-in stage.

Figure 4:
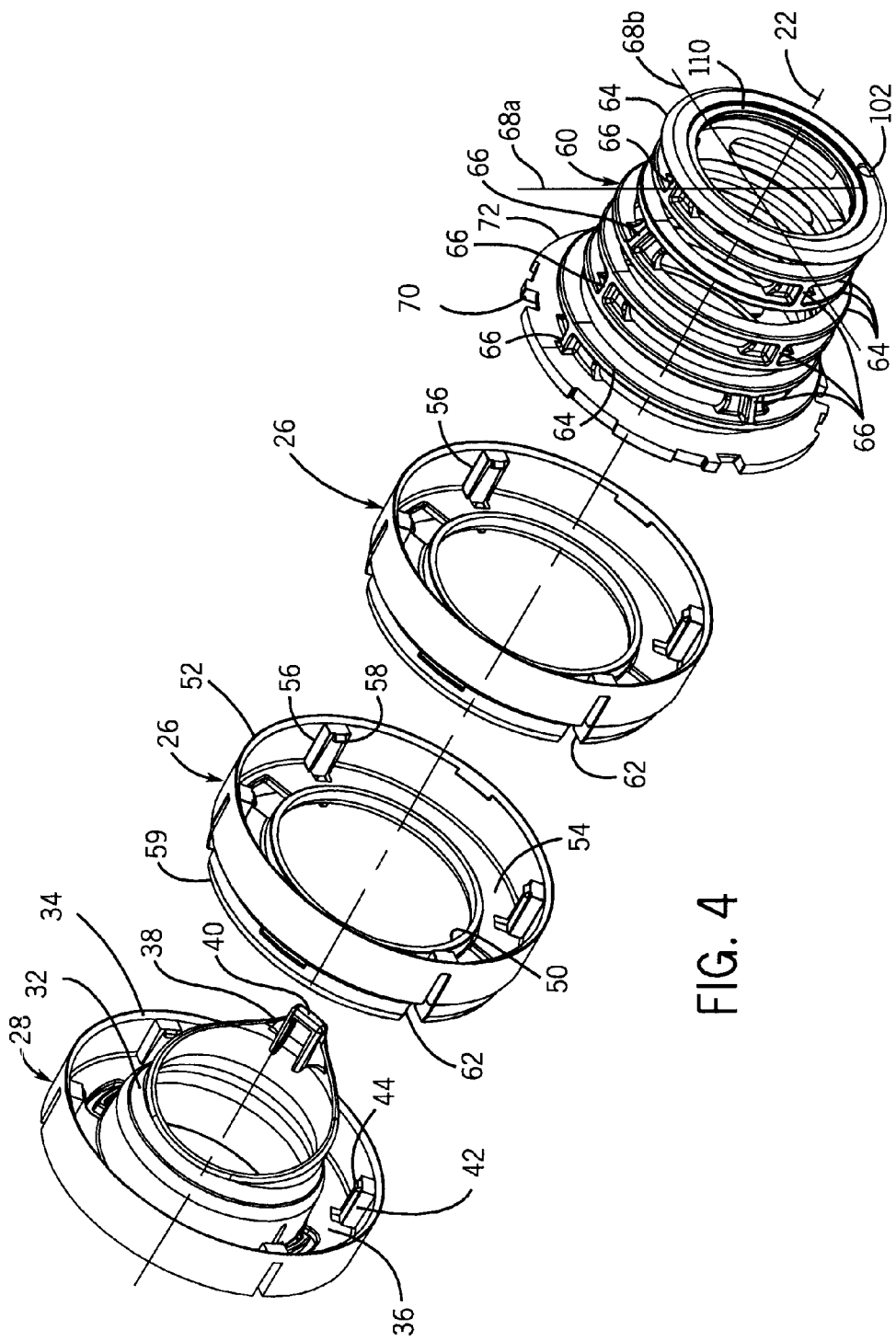
FIG. 4 is an enlarged exploded view of a portion of the valve control assembly shown in FIG. 1.

Turning to FIG. 4, the valve control assembly 10 may also include a plurality of extensions 26 that interlock with each other and thus compensate for varying thickness of the wall 12. One of the extensions 26 is snap-fit to an adaptor 28. The adaptor 28 engages a projection from a valve cartridge 30 such that rotation of the adaptor 28 drives the projection to alter the ratio of hot to cold water. The adaptor 28 is an annular body having an inner leg 32 and an outer leg 34 that are connected by a bridging surface 36 to establish a generally U-shaped cross-section. The inner leg 32 includes a lip 38 having a tab 40 that is configured to engage a mating recess (not shown) on the valve cartridge 30, thus controlling the temperature of the water by rotation of the adaptor 28.

The outer leg 34 includes a plurality of raised fingers 42 that have a clip 44 at the distal end thereof. The fingers 42 are configured to releasably engage the adjacent extension 26.

Depending on the thickness of the wall 12, none, one, or more extensions 26 may be nested together to ensure proper engagement and rotation of the adaptor 28. As with the adaptor 28, each extension 26 includes an inner leg 50 and an outer leg 52 that are connected by a bridging surface 54. The outer leg 52 includes similar raised fingers 56 and clips 58 to engage an adjacent extension 26. The outer leg 52 defines a tapered lip 59 that is sized to nest between the outer leg 34 and inner leg 32 of the adaptor 28.

Upon engaging the extension 26 into the adaptor 28, a series of slots 62 formed in the outer leg 52 of the extension 26 receive the fingers 42 of the adaptor 28. The clips 44 of the adaptor 28 seat in mating dimples (not shown) formed in the slots 62 of the extension 26. The engagement between the fingers 42 of the adaptor 28 and the slots 62 of the extension 26 ensure that the adaptor 28 and extension 26 rotate essentially in unison. One skilled in the art will appreciate that a variety of alternative interlocking structures may be used to couple the adaptor 28 and associated extensions 26.

As also shown in FIG. 4, a second extension 26 is nested to the adjacent extension 26. Again, the fingers 56 of one extension 26 nearest the adaptor 28 seat into slots 62 formed in the second extension 26. The fingers 56 of the second extension 26 are configured to engage the mating flexible coupling 60.

The flexible coupling 60 accommodates for out of plumb conditions between the valve cartridge 30 (and associated valve housing 16) and the wall 12 with respect to temperature adjustment. The flexibility of the flexible coupling 60 is sufficient to flex with respect to the valve axis 22 while maintaining the ability to transfer rotational motion of the bonnet 24 to the adaptor 28, thus preventing binding of the valve control assembly 10.

With specific reference to FIG. 4, the flexible coupling 60 includes a plurality of axially-spaced concentric rings 64 that are coupled by a pair of links 66 preferably spaced 180 degrees apart and displaced 90 degrees from an adjacent pair of links 66. As a result, the flexible coupling 60 is able to bend about a vertical axis 68a and a horizontal axis 68b. The links 66 may be spaced at any number of various locations about the rings 64 to accomplish the desired flexibility and ability to bend about various axes.

Additionally, the number of rings 64 and the spacing there between may be altered and/or non-uniform if desired. The flexible coupling 60 is preferably molded from a resilient plastic material capable of deforming numerous times without breaking.

Rotation of the flexible coupling 60 is transferred to the adjacent extension 26, if present, or directly to the adaptor 28 via a series of notches 70 formed in a flange 72. The flange 72 seats adjacent the bridging surface 54 of the extension 26 (as shown in the FIG. 4 configuration) or the bridging surface 36 of the adaptor 28 if no extension 26 is used.

Again, various structures are available to provide rotational engagement between the flexible coupling 60 and the adaptor 28 (or extension 26) that are within the scope of the present invention. For example, a series of grooves may be formed in the adaptor 28 that are engaged by mating protrusions formed on the flange 72.

Figure 6:
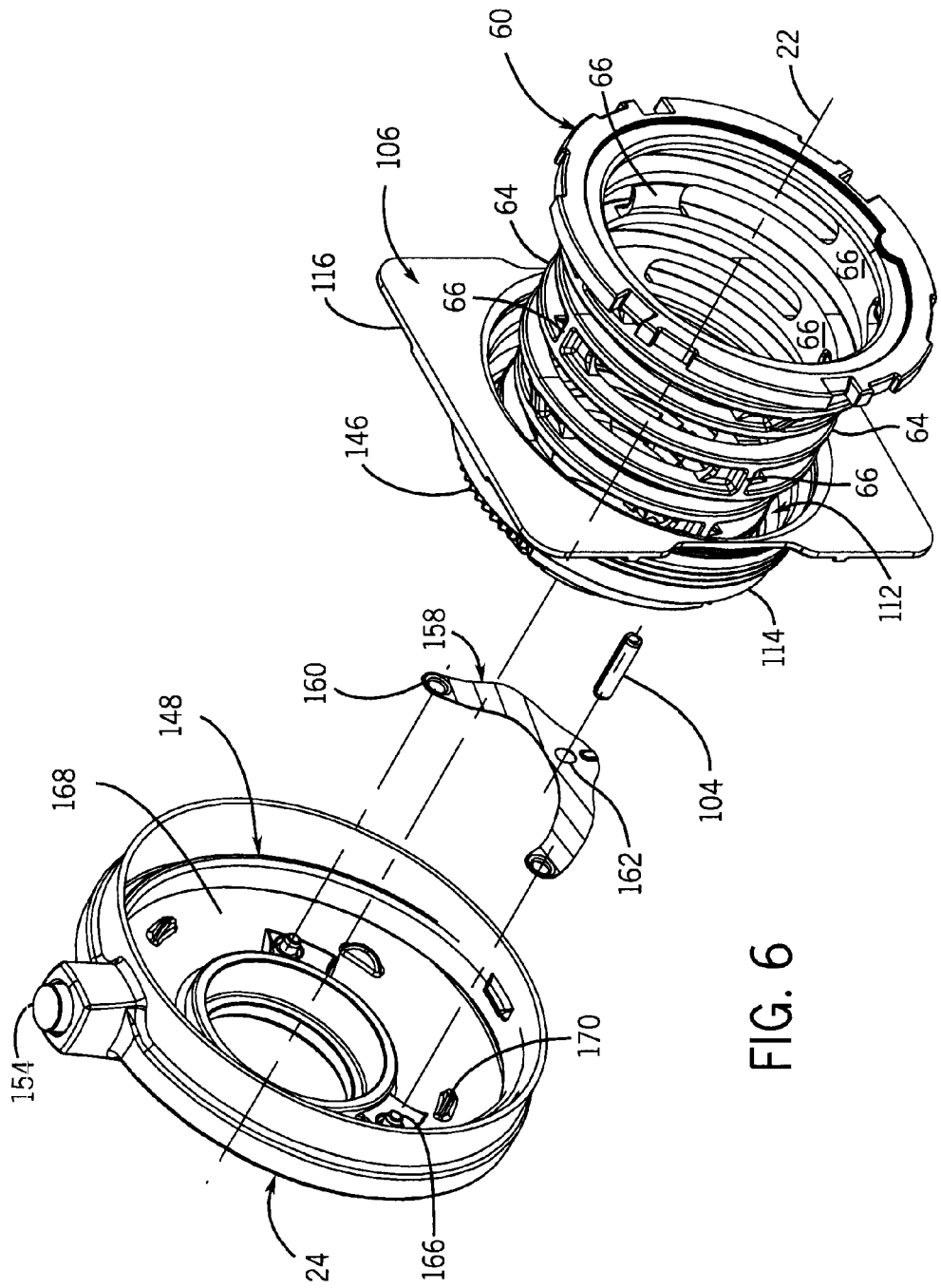
FIG. 6 is an enlarged exploded view of another part of the valve control assembly.

Returning to FIG. 2 and with additional reference to FIGS. 4 and 6, the flexible coupling 60 includes a recess 102 that engages a drive pin 104. The drive pin 104 is ultimately driven by the bonnet 24 to adjust the temperature of the water. A mounting hub 106 sandwiches a flexible coupling bearing 108 between a groove 110 formed in a ring 64 of the flexible coupling 60 and a cavity 112 defined by a threaded collar 114 that protrudes from a flange 116 of the mounting hub 106.

A mounting plate 118 has a peripheral mounting flange 120 including a pair of holes 122 for receiving a pair of screws 48 to capture the adaptor 28, extensions 26, flexible coupling 60, and flexible coupling bearing 108. The flange 116 of the mounting hub 106 seats in a mating socket 124 formed in the mounting plate 118 to prevent rotation of the mounting hub 106. A gasket 126 is included at least along the upper edge of the mounting flange 120 to prevent water draining down the wall 12 from leaking past the mounting plate 118. The gasket 126 may alternatively follow the entire periphery of the mounting flange 120.

Figure 5A:
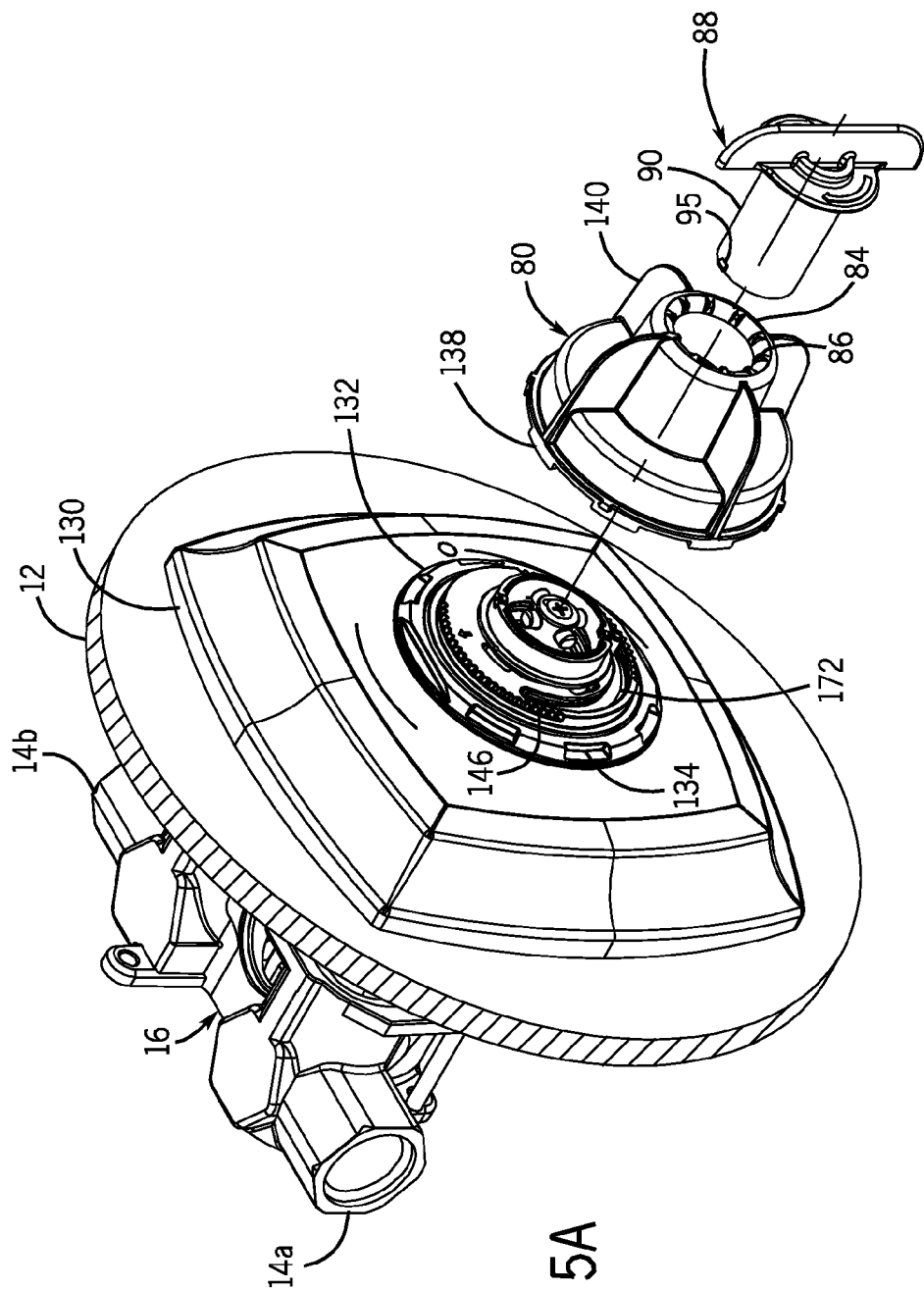
FIG. 5A is a view similar to FIG. 3B, but with parts of the installation tool exploded away.
Figure 5B:
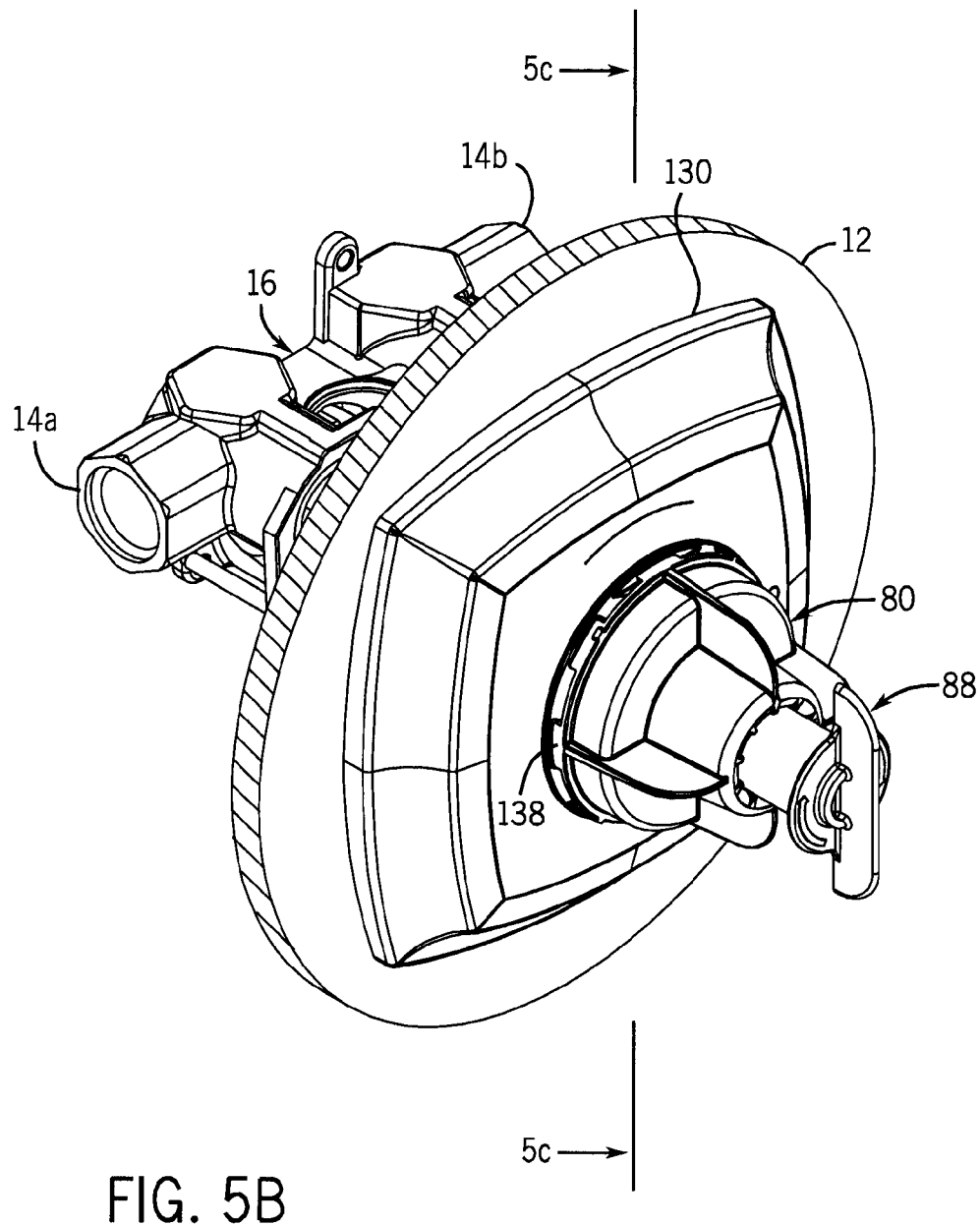
FIG. 5B is a view similar to FIG. 3B, but with a shroud removed.

With the opening 128 formed in the mounting plate 118 centered about the valve axis 22, a decorative escutcheon 130 is seated adjacent the wall 12. With additional reference to FIGS. 5A, 5B, and 5C, the escutcheon 130 is secured to the wall 12 by a mounting hub nut 132 that is rotated about the threaded collar 114 of the mounting hub 106. The mounting hub nut 132 includes a plurality of annularly spaced notches 134 that are engaged by the driver 80 of the installation tool/shroud 74.

Figure 3C:
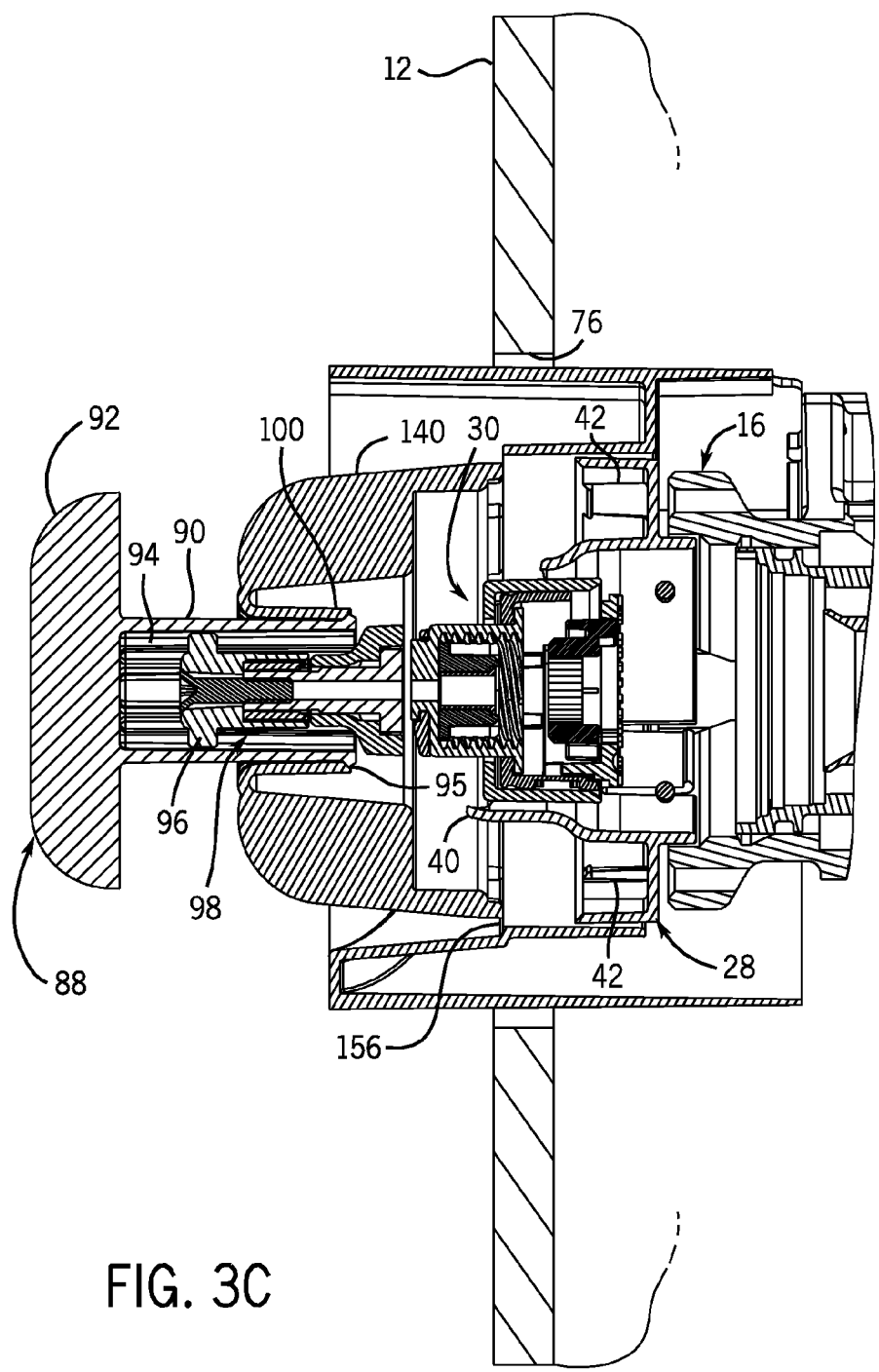
FIG. 3C is a sectional view taken along line 4C-4C of FIG. 3B.

The driver 80 is separated from the installation tool/shroud 74 about an annular interface 136 (shown best in FIG. 3C). The driver 80 is preferably integrally molded with the balance of the installation tool/shroud 74. The driver 80 includes a plurality of annularly spaced teeth 138, shown in FIG. 5A, that are configured to engage the notches 134 of the mounting hub nut 132. Once the driver 80 is engaged with the mounting hub nut 132 (shown in FIG. 5B), the driver 80 is then rotatable with the aid of drive fins 140 to tighten the mounting hub nut 132, locating the escutcheon 130 on the wall 12. The driver 80 can be retained and used to remove the mounting hub nut 132 to perform maintenance or repair on the valve control assembly 10.

Figure 5C:
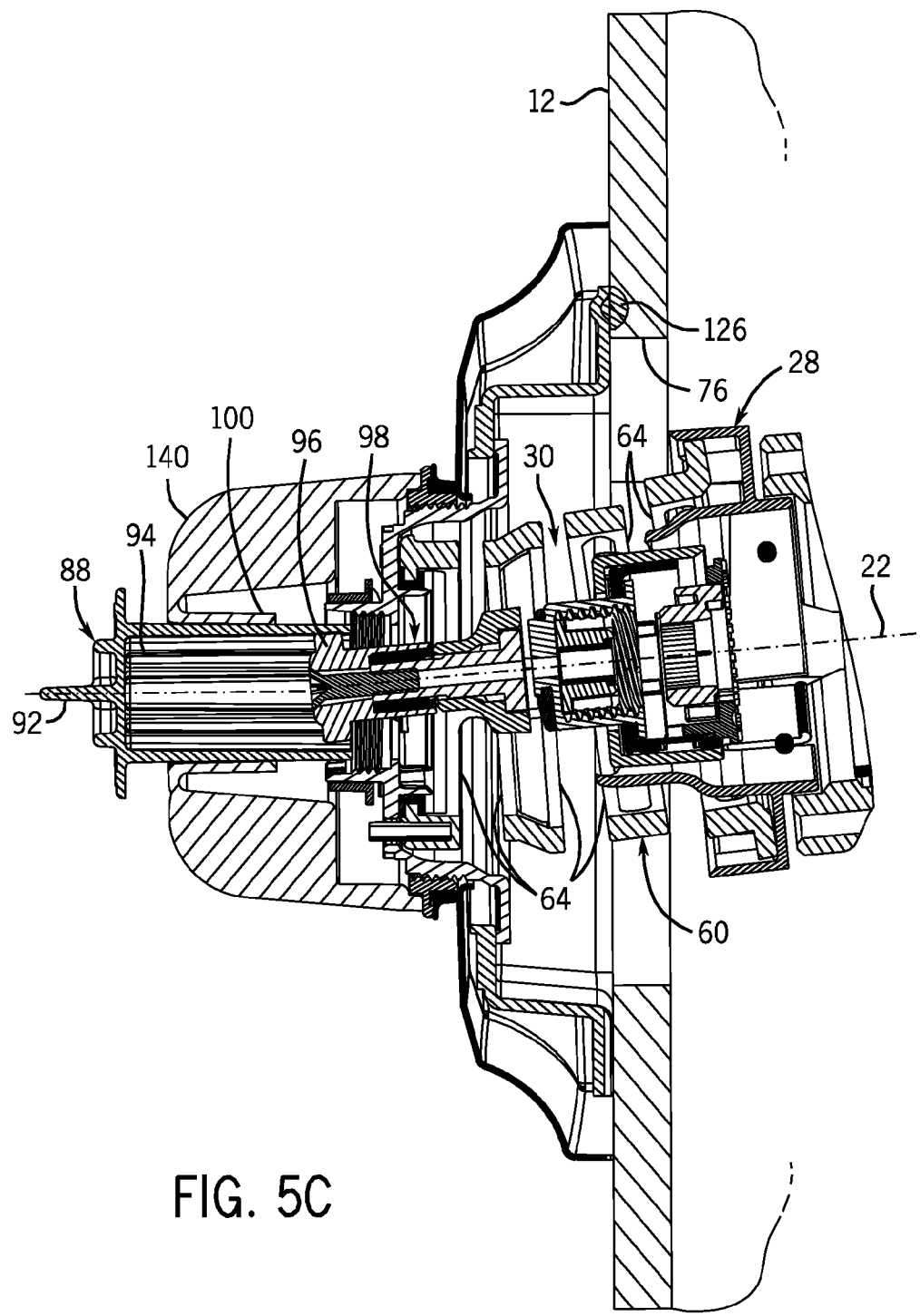
FIG. 5C is a sectional view of certain other parts of the valve control assembly shown in FIG. 1.

As discussed with reference to FIGS. 3A, 3B, and 3C, the volume control handle 88 is capable of extending into the driver 80 to engage the valve stem 98. However, as shown in FIG. 5C, the channels 94 of the volume control handle 88 are configured to engage the protrusions 96 of the valve stem 98 even if the valve axis 22 is tilted away from a direction normal to the wall 12.

A temperature override stop ring 142 inhibits the use of hot water above a specified temperature, but optionally provides an ability to override that setting. It includes a plurality of internal teeth 144 that engage external teeth 146 on the mounting hub 106. Relative placement of the temperature override stop ring 142 on the mounting hub 106 adjusts the rotational limit of the bonnet 24 and thus hot water temperature available during normal valve control assembly 10 operation.

The rotation of the bonnet 24 is limited by the engagement of a temperature override ring 148 with a stop ridge 150 formed on the temperature override stop ring 142. The temperature override ring 148 is housed in the bonnet 24 and includes a stop tab 152. The stop tab 152 is coupled to a resilient button 154 such that when the button is un-depressed, the stop tab 152 interferes with the stop ridge 150 on the temperature override stop ring 142, therefore preventing rotation of the bonnet 24 beyond a preset limit. Depressing the button 154 causes the stop tab 152 to move radially inward until a channel 156 formed in the stop tab 152 allows the stop ridge 150 of the temperature override ring 148 to pass through unobstructed. As a result, the bonnet 24 can be rotated further to allow an increased ratio of hot water.

With specific reference to FIG. 6, the interaction between the valve cartridge 30, flexible coupling 60, and bonnet 24 are shown in greater detail. The drive pin 104 that extends from the flexible coupling 60 engages a resilient drive clip 158. In the preferred embodiment, the drive clip 158 is a generally U-shaped metallic clip having a pair of eyelets 160 proximate the ends and a central opening 162. The eyelets 160 are pressed onto respective posts 166 that protrude from an inner surface 168 of the bonnet 24. The inner surface 168 also includes a plurality of annularly spaced tabs 170 that help align the drive clip 158 and ride against the mounting hub 106.

The drive pin 104 extends through an arcuate slot 172 formed in the mounting hub 106. As the bonnet 24 is rotated, the coupled drive clip 158 engages the drive pin 104. The drive pin 104, being in engagement with the flexible coupling 60, causes the flexible coupling 60 to rotate essentially in unison with the bonnet 24, even when the valve axis 22 is not normal to the wall 12.

Figure 2:
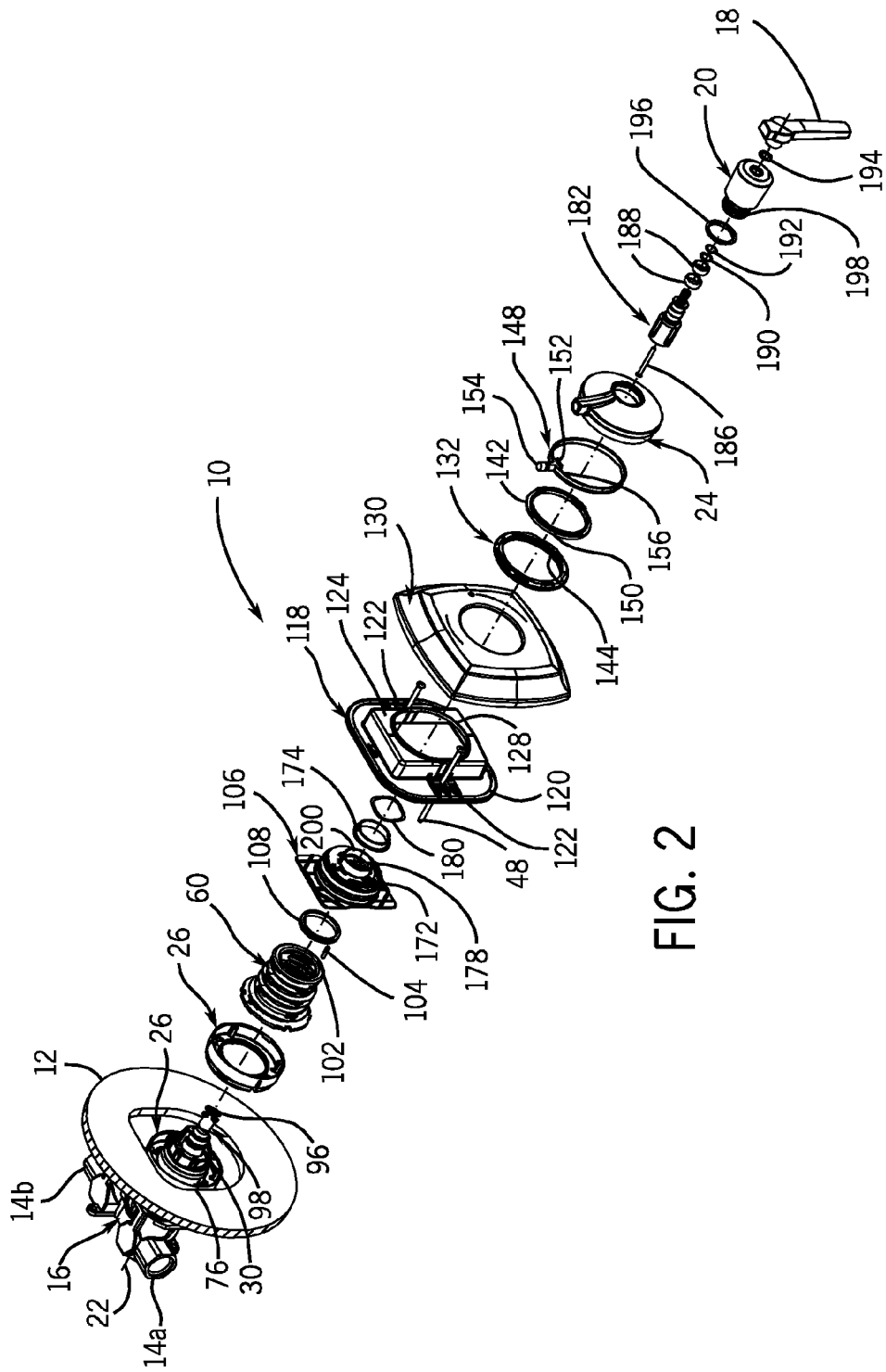
FIG. 2 is an exploded view thereof.
Figure 7:
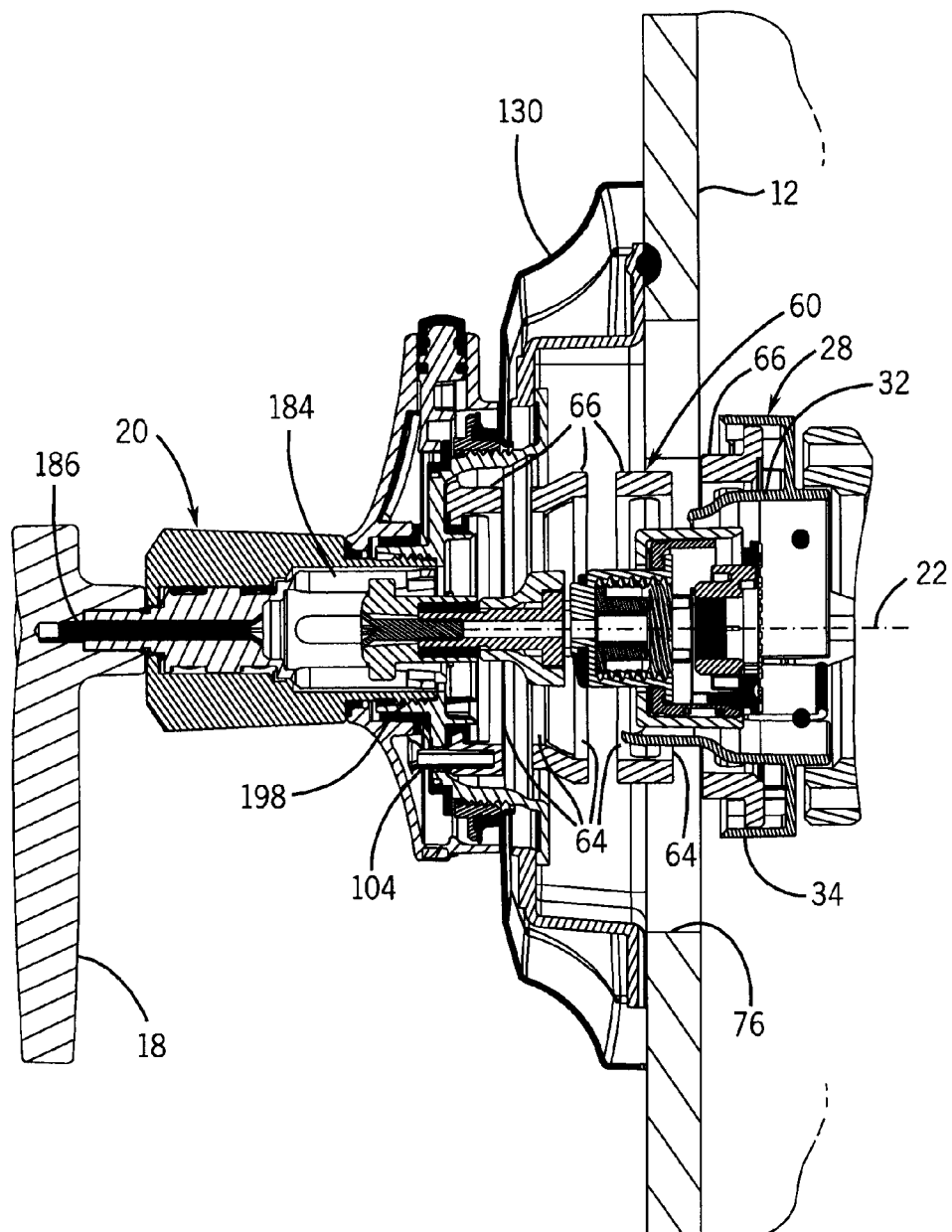
FIG. 7 is a sectional view taken along line 7-7 of FIG. 1.

The remaining valve control assembly 10 components are coupled as shown in FIGS. 2 and 7. Note that FIG. 7 is shown without the intermediate extensions 26 shown in FIG. 4. However, the assembly is similar but for the intermeshing of the temperature adaptor extensions 26 used to account for varying wall 12 thicknesses. A temperature bonnet bearing 174 is seated over a collar 178 of the mounting hub 106 and is adjacent a spring washer 180.

A sleeve or stem driver 182 having a plurality of channels 184, similar to the volume control handle 88, is coupled to the volume control handle 18 via a screw 186. A pair of bearings 188, a spring washer 190, and a washer 192 are captured within the decorative skirt 20. A washer 194 is placed between the decorative skirt 20 and the volume control handle 18 to provide smooth movement between the components. Additionally, a volume bonnet bearing 196 is sandwiched between the decorative skirt 20 and the bonnet 24 when a threaded portion 198 of the decorative skirt 20 engages mating threads 200 in the mounting hub 106.

Figure 8:
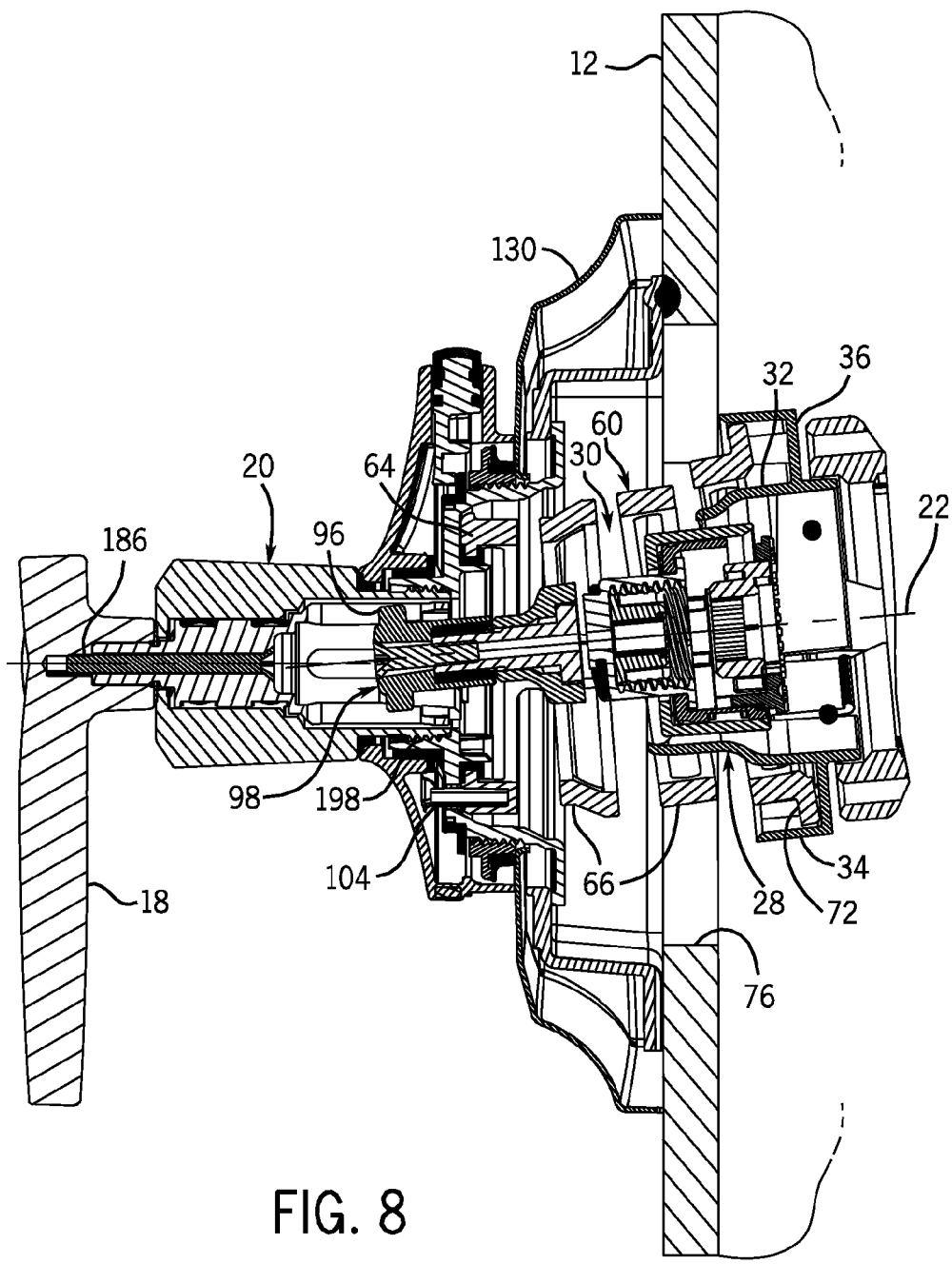
FIG. 8 is a view similar to FIG. 7 but with an out of plumb wall installation shown.

Turning to FIG. 8, the ability of the flexible coupling 60 to adapt to out of plumb or misaligned conditions is shown in greater detail, albeit without the intermeshing temperature adaptor extensions 26. In typical valve control assembly 10 installations, the valve axis 22 is unlikely to be perfectly normal to the wall 12. As a result, the valve control assembly 10 is capable of adapting to relative misalignment between the wall 12 and the valve axis 22.

When the valve housing 16, and hence valve cartridge 30, is misaligned as shown in FIG. 8, the adaptor 28 is also misaligned. While not shown in FIG. 8, this condition would also result in the intermeshing extensions 26 being misaligned. The flexible coupling 60 would adapt similarly in this situation. The flange 72 of the flexible coupling 60 is captured between the outer leg 34 and the inner leg 32 of the adaptor 28. Additionally, the notches 70 intermesh with the fingers 42 of the adaptor 28 (or fingers 56 of the extension 26 when used).

The rings 64 pivot as needed about the links 66 to allow the flexible coupling 60 to rotate smoothly essentially about the valve axis 22. As a result, rotation of the bonnet 24 is smoothly transferred to the flexible coupling 60 via the resilient drive clip 158 and drive pin 104 that also help compensate for misalignment. The drive clip 158 is flexible so as to accommodate any misalignment between the recess 102 in the flexible coupling 60 and the resting position of the drive clip 158 and associated bonnet 24 dictated by the wall 12.

The valve control assembly 10 is thus capable of protecting the components during installation, aiding the installation and testing of various components, and adjusting for various mounting conditions, including varying thicknesses and misalignments, and otherwise permit separate hot and cold adjustment.

Preferred example embodiments of the present invention have been described in considerable detail. Many modifications and variations of the preferred example embodiments described will be apparent to a person of ordinary skill in the art. For example, the flexible coupling 60 may be adapted to control the flow rate of water through the valve cartridge 30 instead of, or in addition to, the temperature of the water in some embodiments. Therefore, the invention should not be limited to the example embodiments described.

INDUSTRIAL APPLICABILITY

The invention provides valve control assemblies which accommodate out of plumb conditions for separate drivers of volume and temperature control, accommodate different wall thicknesses, and/or provide for protection and testing of the valve during rough-in.

What is claimed is:

1. A valve control assembly installed through an essentially vertical support wall, wherein the valve control assembly is configured to receive water at a valve cartridge and direct the water in response to a water control member positioned adjacent the essentially vertical support wall, the valve cartridge defining a longitudinal valve axis, the valve control assembly comprising:
   a flexible coupling having a plurality of links configured to allow the flexible coupling to flex with respect to the longitudinal axis of the valve cartridge; and
   a resilient drive clip capable of transferring rotational movement of the water control member to the flexible coupling, the flexible coupling capable of transferring rotational movement from the clip to a portion of the valve cartridge regardless of whether the longitudinal valve axis is normal to the vertical support wall or not normal to the vertical support wall.

2. The valve control assembly of claim 1, wherein the resilient drive clip engages a pin coupled to the flexible coupling.

3. The valve control assembly of claim 1, wherein the resilient drive clip also comprises a pair of eyelets that are coupleable to a pair of posts extending from the water control member.

4. The valve control assembly of claim 1, wherein the resilient drive clip is essentially U-shaped and engages a pin between the pair of eyelets located proximate ends of the resilient drive clip.

5. The valve control assembly of claim 1, wherein the flexible coupling comprises a plurality of axially-spaced rings that are coupled by the links.

6. The valve control assembly of claim 5, wherein adjacent rings are coupled by a pair of links spaced 180 degrees apart.

7. The valve control assembly of claim 6, wherein the pair of links are displaced 90 degrees from an adjacent pair of links.

8. A valve control assembly configurable to control volume and temperature of water flowing through a plumbing control valve, the valve control assembly comprising:
   a valve cartridge having:
      (a) an axially extending valve stem linked to the valve cartridge such that rotation of the valve stem on its own longitudinal axis can control the volume of water flowing through the plumbing control valve if water is supplied to the plumbing control valve;
      (b) a handle linked to the valve stem to control its rotation;
      (c) a flexible coupling linked to the valve cartridge such that rotation of the coupling on its own longitudinal axis can control the temperature of water flowing through the plumbing control valve if two different temperature supplies of water are supplied to the plumbing control valve, the flexible coupling having a plurality of links configured to allow the flexible coupling to flex with respect to the longitudinal axis of the valve stem; and
      (d) a bonnet positioned around the valve stem and linked to the flexible coupling such that rotation of the bonnet causes rotation of the flexible coupling.

9. The valve control assembly of claim 8, wherein there is a sleeve positioned between the handle and the valve stem, the sleeve having an axially extending slot, and the valve stem having a radial projection positionable in the slot, whereby the projection may be accommodated in the sleeve slot even when the handle is not longitudinally aligned with the valve stem.

10. The valve control assembly of claim 8, wherein the flexible coupling can facilitate transferring rotational force from the bonnet to a portion of the valve cartridge, even when the bonnet is not longitudinally aligned with the valve cartridge.

11. The valve control assembly of claim 10, further comprising a temperature adaptor operationally positioned between the valve cartridge and the flexible coupling.

12. The valve control assembly of claim 11, wherein the flexible coupling includes a flange having a plurality of notches that engage a plurality of mating fingers formed in the temperature adaptor.

13. The valve control assembly of claim 8, wherein the flexible coupling comprises a plurality of axially-spaced rings that are coupled by the links.

14. The valve control assembly of claim 13, wherein the plurality of rings comprise a first ring and a second ring having a greater diameter than the first ring.

15. The valve control assembly of claim 13, wherein adjacent rings are coupled by a pair of links spaced 180 degrees apart.

16. The valve control assembly of claim 15, wherein the pair of links are displaced 90 degrees from an adjacent pair of links.

* * * * *